June 6, 1967 — W. KOBER — 3,324,321
DYNAMOELECTRIC MACHINE
Filed Dec. 4, 1962 — 2 Sheets-Sheet 1

INVENTOR.
WILLIAM KOBER
BY
Christel & Bean
ATTORNEYS.

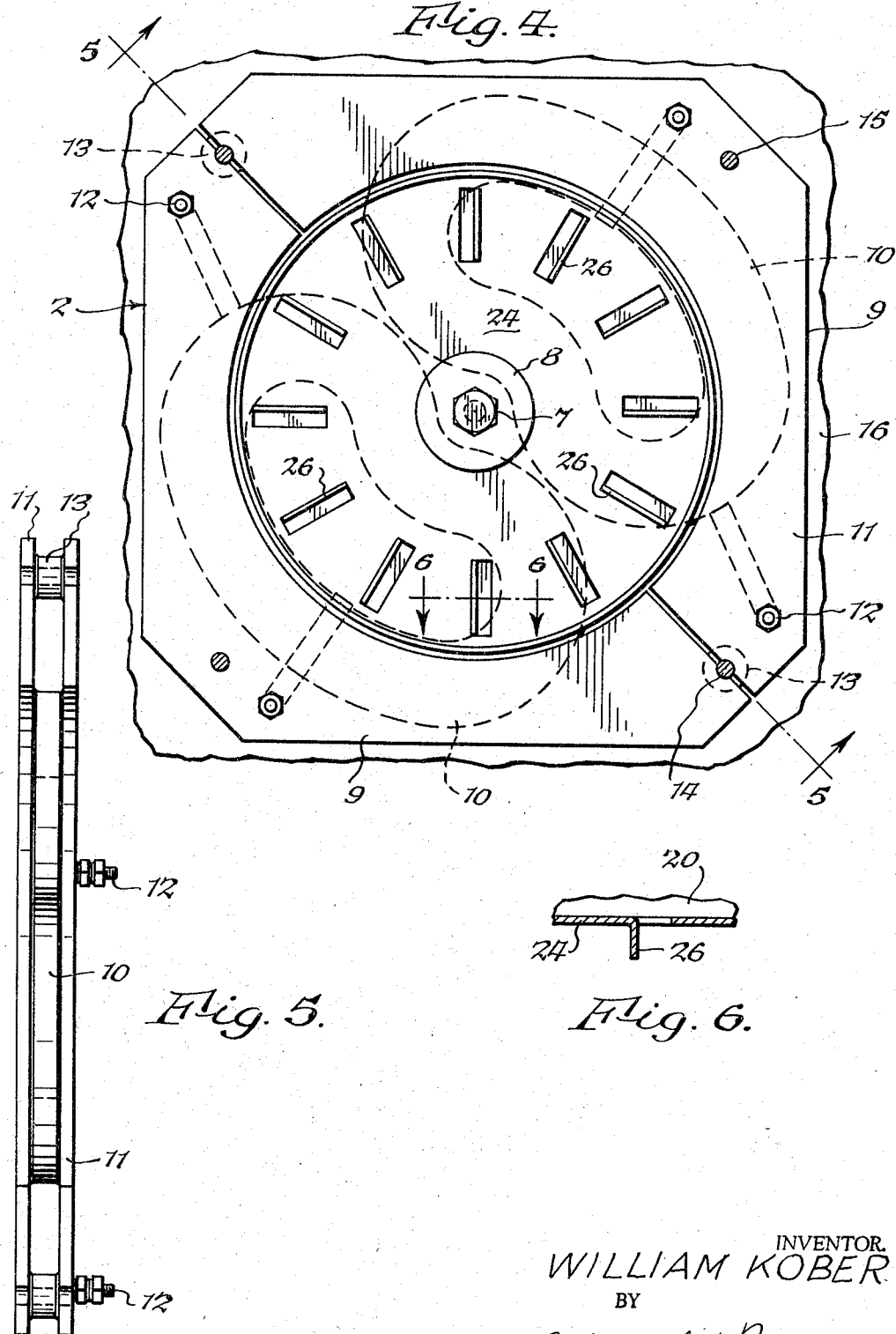

United States Patent Office 3,324,321
Patented June 6, 1967

3,324,321
DYNAMOELECTRIC MACHINE
William Kober, Fairport, N.Y., assignor, by mesne assignments, to The Garrett Corporation, Los Angeles, Calif., a corporation of California
Filed Dec. 4, 1962, Ser. No. 242,260
7 Claims. (Cl. 310—156)

This invention relates generally to the dynamoelectric art, and more specifically to new and useful damping, magnet protecting and cooling arrangements for dynamo field producing structures, being particularly directed to dynamoelectric machines of the axial air gap type utilizing, in the field producing portion thereof, ceramic permanent magnet material. This application is a continuation-in-part of my pending applications Ser. No. 838,949, filed Sept. 9, 1959 and Ser. No. 162,643, filed Dec. 28, 1961.

In recent years, ceramic magnet materials have been developed which make possible the use of ceramic permanent magnets, and such ceramic magnets offer many advantages. For example, they have greater resistance to demagnetization than Alnico and like materials, and a higher M.M.F. per unit length. Also, they are more adaptable, and lighter in weight.

However, such ceramic magnets also present problems with respect to the support and protection thereof, from both a physical and a magnetic viewpoint, in an axial air gap construction. For example, they are brittle and require a supporting structure of substantial physical strength. This is particularly true in axial air gap arrangements where the magnet or magnets extend generally lengthwise of the axis of rotation and must be supported along the edge against centrifugal force.

Accordingly, an object of this invention is to provide a retaining and supporting structure, for a ceramic magnet of annular form, working across an axial air gap, which structure is characterized by a high degree of physical strength while being mechanically relatively simple.

The problem of magnetic protection is two-fold. When an alternating current generator is loaded single phase, pole face damping increases its capacity and reduces heating produced in the pole faces by armature load currents. A decrease in resistance of the damper paths is accompanied by an increase in the effectiveness of the damper winding, and the resistance should be at least as low as the one turn equivalent resistance of the armature.

In addition to damping, a permanent magnet generator requires protection of the magnet material from the demagnetizing effects of armature reaction, which is at its worst under short circuit conditions. A permanent magnet can be protected against the transient short circuit demagnetizing effect by encircling the magnet and its flux with an electrically conductive path. The protecting effect is proportional to the electrical conductivity of the path, and has no theoretical limit. The steady state short circuit demagnetizing effect cannot be opposed by current carrying paths, of either the encircling type or the pole face damper type, in a polyphase loading. However, if the loading is only single phase, a heavy damper can reduce the peak demagnetizing force to one-half its magnitude without such damping, which is an important gain.

Therefore, it is desired to provide both types of electrically conductive paths in a permanent magnet machine.

Pole face damping and the magnet encircling type of protection are quite different in theory, and normally also are quite different in application. Indeed, when the permanent magnet field has magnetic pole faces, the damper can closely resemble that which is used in conventional electromagnet field machines. However, when the permanent magnet material is of low permeability, such as the ceramic materials now coming into use, and has no added pole pieces, production of the required electrical conductivity in the damping circuit is a problem.

Accordingly, another object of this invention is to provide a ceramic magnet field structure with the desired damping and electrically conductive encircling effects, to protect the magnetic state of the magnet material from overload and short circuit armature reaction.

Another problem is presented by the demagnetizing effect produced by thermal agitation, since operation of the dynamo results in the production of heat.

Therefore, another object of this invention is to provide a ceramic magnet field structure arranged to cool the magnet material in a more efficient manner, and thereby avoid the loss of field strength otherwise encountered.

A dynamo field producing structure constructed in accordance with this invention is characterized in one aspect thereof by the provision of flux producing permanent magnet means, flux return means magnetically connected to one end face of the magnet means, and a casing comprising a first part extending across an end face of the magnet means, a second part encircling the magnet means, and a third part extending behind the flux return means, the casing parts being made of electrically conductive material and being electrically interconnected whereby the casing functions as a damper winding and as a short-circuited winding protecting the magnetic state of the magnet means, the material of the casing parts also being heat conductive, and the casing parts being interconnected in heat conductive relation with the third casing part being formed to provide heat dissipating fins, thereby to cool the casing and magnet means.

In another aspect thereof, a dynamo field producing structure constructed in accordance with my invention is characterized by the provision of flux producing permanent magnet means, flux return means magnetically connected to one end face of the magnet means, and a casing of heat conductive material comprising a first part extending across an end face of the magnet means, a second part encircling the magnet means, and a third part extending behind the flux return means, the casing parts being interconnected in heat conductive relation, and the third casing part being formed to provide heat dissipating fins, the structure being mounted for rotation, thereby to cool the magnet means by directly cooling the casing as well as by circulating air thereover.

In another aspect thereof, a dynamo field producing structure of this invention as characterized by the provision of flux producing permanent magnet means, and a casing of highly electrically conductive material having an outer side portion encircling the outer periphery of the magnet means and a face portion extending across an end face of the magnet means, whereby said casing functions as a damper winding and as a short-circuited winding protecting the magnetic state of the magnet means, and a flux return member of magnetic material connected to the opposite end face of the magnet means.

In another aspect thereof, a dynamo field producing structure of this invention is characterized by the provision of a body of permanent magnet material, a flux return member connected to one end face o fthe magnet body, and a casing of electrically conductive material comprising a face portion overlying one end face of the magnet body, a side portion encircling the magnet body, and a back portion extending across the back of the flux return member, the casing portions being electrically interconnected whereby the casing functions both as a damper winding and as a short-circuited winding around the magnet body to protect the same against the demagnetizing effects of armature reaction.

The foregoing and other objects, advantages and characterizing features of a dynamo field producing structure constructed in accordance with this invention will become clearly apparent from the ensuing detailed description of a presently preferred embodiment thereof, considered in conjunction with the accompanying drawings wherein like reference numerals denote like parts throughout the various views and wherein:

FIG. 4 is an end elevational view taken about on line 4—4 of FIG. 1, but on an enlarged scale, with the encircling housing broken away for convenience of illustration;

Figure 1:
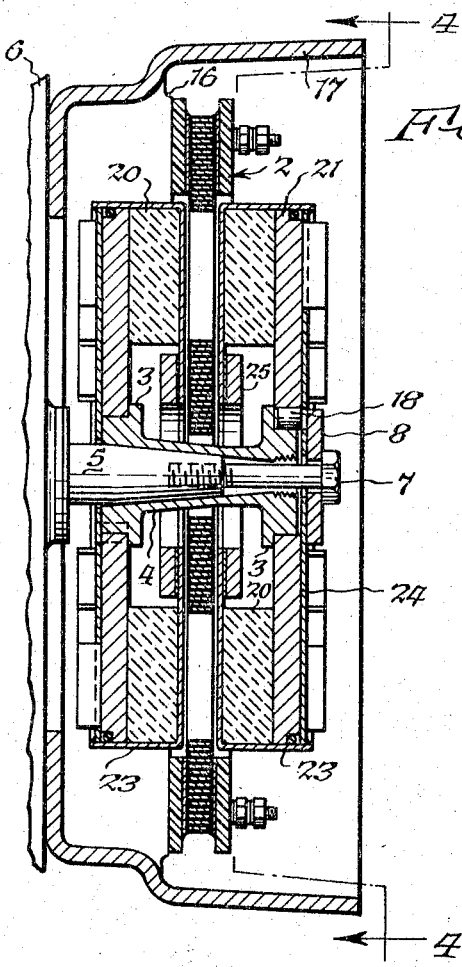
FIG. 1 is a longitudinal sectional view of a generator of this invention.
Figure 2:
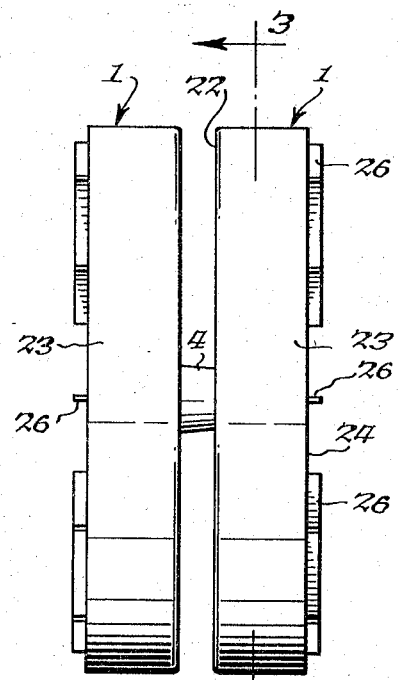
FIG. 2 is a side elevational view of the field producing portion thereof.
Figure 3:
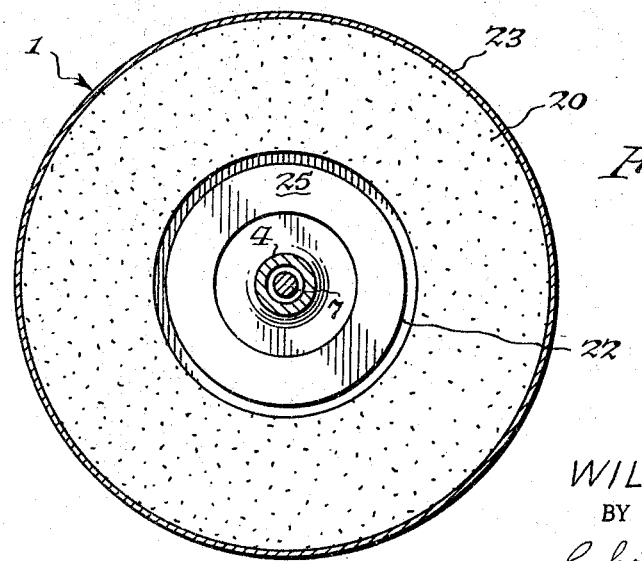
FIG. 3 is a transverse sectional view thereof, taken about on line 3—3 of FIG. 2.

FIG. 5 is an end elevational view of one of the two amature winding units, being taken about on line 5—5 of FIG. 4; and FIG. 6 is a fragmentary, detail view of a heat dissipating fin, taken about on line 6—6 of FIG. 4, but on an enlarged scale, and with the flux return member 20 shown in elevation.

Referring now in detail to the accompanying drawings, there is shown a generator incorporating the field producing structure of this invention, the generator having the basic arrangement disclosed in my pending application Ser. No. 192,122, filed May 3, 1962. Thus, there is provided a pair of identical field producing rotor structures, generally designated 1, and an amature stator arrangement, generally designated 2. Rotors 1 are mounted on the enlarged, annularly shouldered ends 3 of a stub shaft 4, which in turn is force fitted on the output shaft 5 of a prime mover, not shown. The prime mover can be, for example, an internal combustion engine, contained wiihin a housing indicated at 6. The rotor carrying shaft 4 is held in position on shaft 5, for rotation therewith by a bolt 7 threadedly engaging shaft 5 and clamping shaft 4 thereagainst through a washer 8 bearing against the outermost rotor 1. Stub shaft 4 is internally threaded at its outer end to receive a jack screw, not illustrated, after first removing bolt 7, for removing the stub shaft from shaft 5.

Armature 2 comprises paired armature sections or units 9 each containing a winding 10 formed of a flat ribbon conductor, wound with the plane of the ribbon alined with the flux path between rotors 1. Each coil 10 is clamped between paired plates 11, comprising a frame from which project the coil terminals 12, spacing collars 13, carried between plates 11 of one armature unit 9 to extend therefrom between the plates 11 of the other armature unit 9, and receive fastenings 14 therethrough. These, and additional fastenings 15, anchor armature 2 in position on shoulders 16 within an encircling skirt housing 17. This armature construction is shown in detail in FIGS. 39 and 40 of my said application Ser. No. 192,122 to which reference is hereby made for such details.

Inasmuch as the rotors are identical, only one thereof will be described in detail herein. Each rotor 1 comprises an annular body 20 of ceramic permanent magnet material. An example of suitable ceramic materials are those utilizing barium ferrite ($BaFe_{12}O_{19}$), and which are commercially available under various names, such as for example "Index" ceramic permanent magnet sold by the Indiana Steel Products Company of Valparaiso, Ind., and described in its bulletin No. 18.

Each magnet body 20 is mounted on an annular flux return plate 21 of suitable magnetic material, such as iron, which provide the means for mounting the rotors. That is, the flux return member 21 of the left hand rotor in FIG. 1 is shrink or force fitted on the adjacent shouldered end 3 of shaft 4, with a tight fit for rotation therewith, while the other flux return member 21 is mounted on the other shouldered end 3 of shaft 4, being clamped thereon by washer 8 and being locked thereto, for rotation therewith, by a key 18.

The ceramic material of magnet body 20 is brittle, and requires a supporting structure of substantial physical strength particularly in an axial air gap arrangement, as shown, where the magnet body extends lengthwise of the axis of rotation and must be supported along its circumference against centrifugal force.

In the illustrated embodiment, the necessary physical support is provided by a casing having a front face portion 22 extending across the air gap face of magnet body 20, and a side portion 23 which encircles the magnet body and extends axially across the flux return plate 21.

The casing side wall 23 is integral with the front face 22, and supports the magnet body 20 against centrifugal force, being reinforced by the front wall and being further reinforced by its connection to a rear face portion 24 extending across the rear face of flux return member 21. The front face portion 22 also acts to protect the working, air gap face of the magnet body against spalling, and other physical deterioration.

In addition, the casing 22, 23, 24 is formed of a highly electrically conductive material, such as aluminum or copper, thereby providing electrically conductive paths encircling each magnet pole area. These paths extend across front face portion 22 to the ring provided by side portion 23, along ring 23, then back across face portion 22 to an inner collection ring 25, along ring 25, and back to face portion 22 to complete a short-circuited turn. Ring 25 also is of a highly electrically conductive material, such as aluminum or copper, and is electrically joined to the inner circumference of face portion 22. The casing face portion 22 extends completely across the air gap face of magnet body 20, and therebeyond toward the center, and ring 25 is positioned interiorly of the rotor so as to avoid interference with armature 2 and also avoid any necessity for lengthening the air gap. It provides a heavy section of electrically conductive material, to provide a low resistance path near the center. The entire face portion 22 is active in conjunction with these protective conducting paths which encircle the active areas of the magnet body, which areas can be pole areas or areas opposed to armature reaction flux. The net result is that the face portion 22 functions in the manner of a damper winding and, in conjunction with side portion 23 and assisted by ring 25, to provide a short circuited turn protecting the magnetic state of the magnets.

The rear face portion 24 is of value in this respect, because it shortens the electrical flow path. Instead of going around the side portion 23, current can go chordwise across the back of member 21, through the rear face portion 24. This shorter path results in improved conductivity, which is particularly advantageous with a relatively low number of poles.

In addition to its function as a physical support and mechanical shield for the working face of magnet body 20, and its function as a damper and short circuit electrical winding, the casing 22, 23, 24 functions to cool the magnet body 20 and thereby reduce the demagnetizing effect produced by heating during operation. To this end, the casing also is of a highly heat conductive material, of which aluminum and copper are good examples, and the parts 22, 23 and 24 are connected in heat conductive relation. Consequently, in addition to providing the aforesaid electrically conductive path, and casing provides a heat conductive path.

Thus, heat generated during operation of the dynamo is transferred by the conductive casing to its rear face 24, and it is a particular feature of my invention that the rear face 24 is formed to provide heat dissipating fins 26, extending therefrom in the manner of fan blades. In other words, the fan blade, heat transfer fins 26 are formed from the heat conductive material of rear face portion 24, being punched and bent outwardly therefrom as indicated in FIG. 6, whereby the material comprising casing 22, 23, 24 transfers heat conductively to and through the dissipating fins 26. The fins 26 also act in the manner of fan blades, rotating as part of the rotor 1, whereby the casing is directly cooled conductively, through fins 26, as well as by fin induced circulation of air thereover, for more efficient cooling of the magnet body.

Both copper and aluminum are suitable electrical and heat conductive materials. Copper is preferable, on a unit volume basis, while aluminum is preferable on a weight basis. Aluminum, however, does present a problem in brazing or soldering, to provide the desired conductivity in the connection between the parts.

In the illustrated embodiment, face portion 22 and side portion 23 are integral, while rear portion 24 is electrically and heat conductively joined, at its periphery, to side portion 23, as by brazing.

Fins 26 are generally radial, and spaced apart an average distance substantially equal to the radial length of the fins. Such a construction provides the desired heat transfer and air circulating action, without adversely affecting the electrical and heat conductive properties of the rear face portion 24.

Magnet body 20 can be glued or cemented to flux return member 21, and to face portion 22 and side portion 23 of the casing. Where the inner diameter of casing side portion 23 is larger than the outer diameter of magnet body 20, for ease of assembly and to avoid cracking the latter, the space between can be filled with cement.

Accordingly, it is seen that my invention fully accomplishes its intended objects. While I have disclosed and described in detail only one embodiment of my invention, that has been done by way of illustration only, and without thought of limitation.

Having fully disclosed and completely described my invention, and its mode of operation, what I claim as new is:

1. In a dynamo field producing structure, flux producing permanent magnet means, flux return means magnetically connected to one end face of said magnet means, and a casing comprising a first part extending across an end face of said magnet means, a second part encircling said magnet means, and a third part extending behind said flux return means, said casing parts being made of electrically conductive material and being electrically interconnected, whereby said casing functions as a damper winding and as a short-circuited winding protecting the magnetic state of said magnet means, the material of said casing parts also being heat conductive, said casing parts being interconnected in heat conductive relation, and said third casing part being formed to provide heat dissipating fins, thereby to cool said magnet means.

2. In a dynamo field producing structure, flux producing permanent magnet means, flux return means magnetically connected to one end face of said magnet means, and a casing of electrically and heat conductive material comprising a face portion overlying the opposite end face of said magnetic means, a side portion electrically joined to said face portion and encircling said magnet means, and a back portion electrically joined to said side portion and overlying the back face of said flux return means, said casing thereby functioning as a damper winding and as a short-circuit winding protecting the magnetic state of said magnetic means, said casing parts being interconnected in heat conductive relation, and said back casing portion being formed to provide heat dissipating fins, thereby to cool said magnet means.

3. In a dynamo field producing structure, flux producing permanent magnet means, flux return means magnetically connected to one end face of said magnet means, and a casing of heat conductive material comprising a first part extending across an end face of said magnet means, a second part encircling said magnet means, and a third part extending behind said flux return means, said casing parts being interconnected in heat conductive relation, and said third casing part being formed to provide heat dissipating fins, together with means mounting said structure for rotation, thereby to cool said magnet means by cooling said casing as well as by circulating air thereover.

4. In a dynamo field producing structure, a body of permanent magnet material, a flux return member of magnetic material facing one end face of said magnet body, a face portion of electrically conductive material overlying one end face of said magnet body, a side portion of electrically conductive material electrically joined to said face portion and encircling said magnet body, and another portion of electrically conductive material electrically joined to said side portion and extending across the face of said flux return member which is remote from said magnet body, said electrically conductive material functioning as both a damper winding and a short circuited winding around said magnet body to protect the same against the demagnetizing effects of armature reaction.

5. A field producing structure for a dynamoelectric machine of the axial air gap type comprising, an annular body of ceramic magnetic material, an annular casing of highly electrically conductive nonmagnetic material having an outer side wall encircling the outer peripheral side of said magnet body and an end wall extending across the air gap end face of said magnet body, and a flux return member of magnetic material against the opposite end face of said magnet body.

6. A dynamoelectric machine as set forth in claim 5, together with means providing an opposite end wall of highly electrically conductive material extending across said flux return member and joined to said outer side wall.

7. A field producing structure for a dynamoelectric machine of the axial air gap type comprising, an annular body of ceramic magnet material, an annular casing of highly electrically conductive nonmagnetic material having an inner ring and an outer side wall encircling the inner and outer peripheral sides of said magnet body and an end wall extending across the air gap end face of said magnet body between said side walls, and a flux return member of magnetic material against the opposite end face of said magnet body.

References Cited

UNITED STATES PATENTS

| | | | |
|---|---|---|---|
| 2,626,367 | 1/1953 | Beymer | 310—156 |
| 2,683,229 | 7/1954 | Bessiere | 310—268 |
| 2,696,567 | 12/1954 | Madle | 310—42 |
| 2,703,849 | 3/1955 | Worth | 310—156 |
| 2,719,931 | 10/1955 | Kober | 310—156 |
| 2,779,882 | 1/1957 | Ishikakawa | 310—268 |

MILTON O. HIRSHFIELD, *Primary Examiner.*

J. J. SWARTZ, *Assistant Examiner.*